(12) United States Patent
Jeong

(10) Patent No.: US 9,508,210 B2
(45) Date of Patent: Nov. 29, 2016

(54) VENDING MACHINE AND CONTROL METHOD THEREOF

(75) Inventor: Jin-woo Jeong, Gunpo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 987 days.

(21) Appl. No.: 12/476,394

(22) Filed: Jun. 2, 2009

(65) Prior Publication Data

US 2010/0010903 A1 Jan. 14, 2010

(30) Foreign Application Priority Data

Jul. 11, 2008 (KR) ........................ 10-2008-0067834

(51) Int. Cl.
*G06Q 20/00* (2012.01)
*G09F 11/00* (2006.01)
*G07F 9/02* (2006.01)
*G06Q 20/20* (2012.01)

(52) U.S. Cl.
CPC .............. *G07F 9/02* (2013.01); *G06Q 20/203* (2013.01); *G06Q 20/206* (2013.01); *G07F 9/026* (2013.01)

(58) Field of Classification Search
None
See application file for complete search history.

(56) References Cited

U.S. PATENT DOCUMENTS

| | | | | | |
|---|---|---|---|---|---|
| 5,986,543 | A | * | 11/1999 | Johnson ................... | 340/426.19 |
| 2001/0018808 | A1 | * | 9/2001 | Bar-Yona .................. | G07F 9/02 40/454 |
| 2002/0148150 | A1 | * | 10/2002 | Fowler ..................... | G09F 7/18 40/666 |
| 2003/0150146 | A1 | * | 8/2003 | Martin ..................... | G07F 9/023 40/544 |
| 2004/0128889 | A1 | * | 7/2004 | Chirnomas ............... | G07F 9/02 40/611.1 |
| 2004/0187038 | A1 | | 9/2004 | Yachida | |
| 2005/0141020 | A1 | | 6/2005 | Harano | |
| 2005/0254849 | A1 | * | 11/2005 | Honma .......................... | 399/80 |
| 2006/0111160 | A1 | * | 5/2006 | Lin et al. .................... | 455/575.3 |
| 2006/0284861 | A1 | | 12/2006 | Choi | |
| 2008/0010871 | A1 | * | 1/2008 | Holmes et al. ..................... | 40/1 |
| 2008/0301019 | A1 | * | 12/2008 | Monk ............................. | 705/35 |

FOREIGN PATENT DOCUMENTS

| | | |
|---|---|---|
| CN | 1885929 A | 12/2006 |
| JP | 05-290256 A | 5/1993 |
| JP | 10-241018 A | 9/1998 |
| JP | 11-175819 A | 7/1999 |
| JP | 2000-357262 A | 12/2000 |
| JP | 2003044918 A | 2/2003 |
| JP | 2004-161433 A | 6/2004 |
| JP | 2004-303215 A | 10/2004 |
| JP | 2005-165723 A | 6/2005 |

(Continued)

OTHER PUBLICATIONS

Communication, dated Sep. 10, 2012, issued by the State Intellectual Property Office of the People's Republic of China in counterpart Chinese Patent Application No. 200980127607.3.

(Continued)

*Primary Examiner* — Ariel Yu
(74) *Attorney, Agent, or Firm* — Sughrue Mion, PLLC

(57) ABSTRACT

A control method of a vending machine which has a display module to display an image stored therein or inputted from the outside is provided. The control method includes: determining whether a door of the vending machine is open; changing an image mode displayed on the display module if it is determined that the door of the vending machine is open; and displaying a certification mode window to certify a user if the image mode is changed.

21 Claims, 16 Drawing Sheets

(56) References Cited

FOREIGN PATENT DOCUMENTS

| | | | |
|---|---|---|---|
| JP | 2007-69030 A | | 3/2007 |
| JP | 2007-94499 A | | 4/2007 |
| JP | 2007-226647 A | | 9/2007 |
| JP | 2007-331162 A | | 12/2007 |
| JP | 2008-97211 A | | 4/2008 |
| JP | 2009015474 A | * | 1/2009 |
| KR | 10-0143384 B1 | | 8/1998 |
| KR | 10-0368466 B1 | | 1/2003 |
| KR | 10-0704665 B1 | | 4/2007 |
| WO | 2006/034713 A1 | | 4/2006 |

OTHER PUBLICATIONS

Communication, dated Jun. 25, 2013, issued by the State Intellectual Property Office of P.R. China in counterpart Chinese Patent Application No. 200980127607.3.

Communication, dated Jul. 23, 2013, issued by the Japanese Patent Office in counterpart Japanese Patent Application No. 2011-517331.

Communication dated Mar. 30, 2016 issued by European Patent Office in counterpart European Patent Application No. 09794583.6.

Communication, Issued by the Korean Intellectual Property Office, Dated Jul. 16, 2014, In counterpart Korean Application No. 10-2008-0067834.

Communication, Issued by the Japanese Patent Office, Dated Jul. 29, 2014, In counterpart Japanese Application No. 2011-517331.

Communication, dated Apr. 1, 2014, issued by the Japanese Patent Office in counterpart Japanese Application No. 2011-517331.

Communication from the Korean Intellectual Property Office dated Nov. 3, 2014, in a counterpart Korean application No. 10-2008-0067834.

* cited by examiner

FIG. 3A

LOGIN

Please Enter Password (use the keypad)
And Touch Login Button

Password  [ ****** ]
[ 1 ]  [ CHANGE ]  [ LOGIN ]

FIG. 3B

Change Password

| Change Password | ****** |
| New Password | ****** |
| Confirm Password | ****** |

[5] [OK] [CANCEL]

[1] [2] [3] [4] [5] [6] [7] [8] [9] [0] [←]
[Q] [W] [E] [R] [T] [Y] [U] [I] [O] [P]
[A] [S] [D] [F] [G] [H] [J] [K] [L]
[Z] [X] [C] [V] [B] [N] [M] [CLEAR]

FIG. 5B

Set Date & Time

| 2 | | | MAIN |

Date
Year: 2008
Month: 4   (1~12)
Date: 10   (1~31)
Time
Hour: 16   (0~23)
Minute: 21   (0~59)

| 1 | 2 | 3 |
| 4 | 5 | 6 |
| 7 | 8 | 9 |
| . | 0 | ← |

CLEAR

| BACK | 3 | SAVE |

FIG. 7A

Contents Management

2

MAIN

Network | Contents

○ Obtain an IP address automatically
⊙ Use the Following IP address

| IP Address: | 168 . 210 . 72 . 214 |
| Subnet mask: | 3 | 255 . 255 . 255 . 0 |
| Default geteway: | 168 . 210 . 72 . 0 |

| 1 | 2 | 3 |
| 4 | 5 | 6 |
| 7 | 8 | 9 |
| . | 0 | ← |

○ Obtain DNS server address automatically
⊙ Use the following DNS server address

CLEAR

Preferred DNS server: 10 . 33 . 1 . 11
Alternate DNS server: 10 . 32 . 192 . 11

Set Idle Time  10  Seconds      SAVE

VENDING MACHINE AND CONTROL METHOD THEREOF

CROSS-REFERENCE TO RELATED APPLICATION

This application claims priority from Korean Patent Application No. 10-2008-0067834, filed on Jul. 11, 2008, in the Korean Intellectual Property Office, the disclosure of which is incorporated herein by reference.

BACKGROUND OF THE INVENTION

1. Field of the Invention

Apparatuses and methods consistent with the present invention relate to a vending machine and a control method thereof, and more particularly, to a vending machine which has a display unit, and a control method thereof.

2. Description of the Related Art

Generally, a vending machine refers to an unmanned selling device through which a user provides money for a desired product, selects and receives the product. The vending machine is widely used as it is not greatly affected by operation time and installation place and provides customers with products quickly.

The vending machine includes a money mechanism to recognize money such as coins, bills or equivalents provided by a user, a product selection unit to select the product from the vending machine and a product discharger to discharge the selected product. The vending machine may further include a display unit to output information about the product and advertisement contents or to display money provided by a user.

SUMMARY OF THE INVENTION

The present invention provides a vending machine which is easily maintained through a display unit, and a control method thereof.

Various aspects of the present invention will be set forth in part in the description which follows and, in part, will be obvious from the description, or may be learned by practice of the present invention.

The aspects of the present invention are also achieved by providing a control method of a vending machine which has a display module to display an image stored therein or inputted from an outside, the control method including: determining whether a door of the vending machine is open; changing an image mode displayed on the display module if it is determined that the door of the vending machine is open; and displaying a certification mode window to certify a user if the image mode is changed.

The certification mode window may include a part of an area in which a certification code is inputted and a cursor is displayed in the part.

The certification mode window may include a key pad to input letters, symbols or numbers, the control method further includes: detecting a touch with respect to a specific area of the key pad; and inputting letters, symbols or numbers of the key pad corresponding to the specific area in the part of the area in which the certification code is inputted.

The certification mode window may include a log-in button.

The determining whether the door of the vending machine is open may include determining whether the door of the vending machine is connected with a body of the vending machine mechanically or electrically.

The certification mode window may include a button to move to a certification mode change window, and the control method further includes: determining whether the button is selected by a user's touch; and displaying the certification code change window if the button is selected.

The certification code may include at least one number or a combination of letters and numbers.

The control method further includes determining whether the inputted certification code is equal to a prestored certification code if the certification code is inputted.

The control method further includes displaying a maintenance menu to maintain the vending machine if it is determined that the inputted certification code is equal to the prestored certification code.

The maintenance menu may include an item to modify, input, delete or save at least one of a sales volume, a price, an image of a product and a background screen.

The foregoing and/or other aspects of the present invention are also achieved by providing a vending machine, including: a display unit which displays an image stored therein or inputted from the outside; a user input unit which receives an input signal by a user's touch; a door which accommodates the display unit; a detector which detects whether the door is open; and a controller which changes an image mode of the display unit if it is determined that the door is open.

The display unit may display a certification mode window to input a certification mode for user certification if the image mode is changed.

The certification mode window may include a part of an area in which the certification code is inputted, and a cursor is displayed on the part.

The certification mode window may include a key pad to input numbers or letters, and the controller inputs numbers, symbols or letters of the key pad corresponding to a specific area of the key pad, in the part of the area in which the certification code is inputted if a touch is detected from the user input unit with respect to the specific area.

The certification code window may include a log-in button.

The certification code window may include a button to select a certification code change window changing the certification code, and the controller controls the display unit to display the certification code change window if the button is selected from the user input unit.

The vending machine further includes a storage unit to store a prestored certification code therein, wherein the controller determines whether an inputted certification code is equal to the prestored certification code.

The controller may display a maintenance menu to maintain the vending machine if it is determined that the inputted certification code is equal to the prestored certification code, and the maintenance menu includes an item to modify, input, delete or save at least one of a sales volume, a price, an image of the product and a background screen.

The detector may detect whether a door of the vending machine is connected with a body of the vending machine mechanically or electrically to determine a locking state of the door.

BRIEF DESCRIPTION OF THE DRAWINGS

The above and/or other aspects of the present invention will become apparent and more readily appreciated from the following description of the embodiments, taken in conjunction with the accompanying drawings, in which:

FIG. 3A illustrates a certification mode window to certify a user, according to an exemplary embodiment of the present invention;

FIG. 3B illustrates a certification mode change window to change a password, according to an exemplary embodiment of the present invention;

FIGS. 5A to 5C illustrate a set time menu, according to an exemplary embodiment of the present invention;

FIGS. 7A to 7B illustrate a "Contents Management" menu, according to an exemplary embodiment of the present invention;

DETAILED DESCRIPTION OF EXEMPLARY EMBODIMENTS

Hereinafter, exemplary embodiments of the present invention will be described with reference to accompanying drawings, wherein like numerals refer to like elements and repetitive descriptions will be avoided as necessary.

Figure 1:
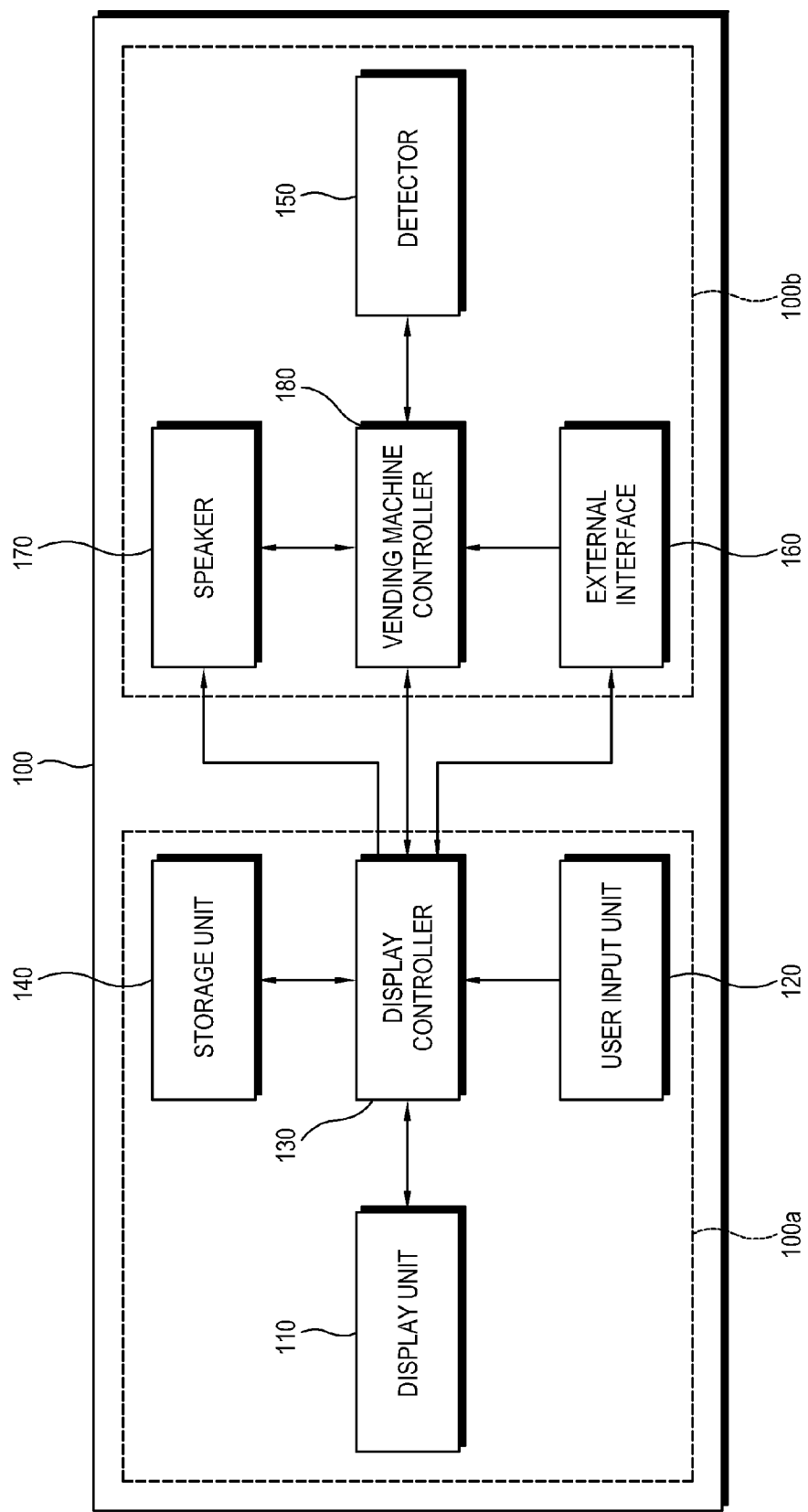
FIG. 1 is a control block diagram of a vending machine according to an exemplary embodiment of the present invention.

FIG. 1 is a control block diagram of a vending machine which has a display unit, according to an exemplary embodiment of the present invention. A door 100 of the vending machine includes a display module 100a and a vending machine module 100b. The display module 100a has a display unit 110, a user input unit 120, a display controller 130 and a storage unit 140. The vending machine module 100b has a detector 150, an external interface 160, a speaker 170 and a vending machine controller 180. Although FIG. 1 illustrates that the door 100 has the display module 100a and the vending machine module 100b, separately, the vending machine according the exemplary embodiment is not limited thereto. Alternatively, the door 100 may have the display module 100a and the vending machine module 100b as a single body.

The display unit 110 displays an image inputted from the outside of the display module 100a or an image stored therein, for example, in the storage unit 140 therein. Images which are displayed on the display unit 110 may include a user mode displaying a menu screen for a user to select a product to be sold from the vending machine or an advertisement screen; and a maintenance mode to display a maintenance menu to maintain the vending machine. If the image mode which is displayed on the display unit 110 is changed from the user mode to the maintenance menu, the display unit 110 may display a certification mode window (to be described later) and may further display a key pad to input letters or numbers. The display unit 110 generally includes a liquid crystal display (LCD), but not limited thereto. The display unit 110 may include at least one of the LCD, a plasma display panel (PDP) and an organic light emitting diode (OLED).

The user input unit 120 may generate static electricity and recognize a touched location if touched by a user. If a user touches and selects a certain area of an image displayed on the display unit 110, the user input unit 120 detects the touched location and selects the image displayed on the touched location so as to provide the same effect as that through a mouse (not shown). The user input unit 120 may be provided to contact the display unit 110. That is, the user input unit 120 may include a touch panel which is provided on a front side of the display unit 110 or installed therein.

FIG. 1 illustrates the user input unit 120 and the display unit 110 which are separated from each other. However, such a configuration is provided for purposes of convenience but does not mean the physical separation of the two units. A user may manipulate the user input unit 120 while watching the menu screen or a maintenance menu displayed on the display unit 110.

That is, a user may select a desired product, or maintain the vending machine by selecting a plurality of sub menus in the maintenance mode.

The display controller 130 controls the display unit 110 to display an image thereon. The display controller 130 converts various image signals into a format displayable by the display unit 110 and applies scaling to the image signals according to a resolution of the display unit 110. The display controller 130 executes a user's command inputted through the user input unit 120. According to the present exemplary embodiment, the display controller 130 transmits information about the product selected by a user to the vending machine module 100b through the user input unit 120 or to display a sub menu according to the menu selected by a user.

The display controller 130 changes the image mode of the display unit 110 if receiving a detection signal through the detector 150 indicating that the door 100 is open. If the image mode is changed and a certification mode window is displayed, the display controller 130 determines whether an inputted certification code is the same as a preset certification code and executes a subsequent operation.

The display controller 130 controls the speaker 170 to output an audio signal. If the product or menu is selected, the display controller 130 controls the speaker 170 to output an effect sound stored in the storage unit 140. If an image including audio data is displayed, the display controller 130 controls the speaker 170 to output an audio signal corresponding to the audio data.

The display controller 130 communicates with the vending machine controller 180 and performs various control operations related to the vending machine. The display controller 130 controls the display unit 110 to receive from the vending machine controller 180 information about products sold at the vending machine and information about money inserted in the vending machine and display the received information, or transmits information about the product inputted from the user input unit 120 to the vending machine controller 180. The display controller 130 may receive from the vending machine controller 180 data including images and audio downloaded through the external interface 160, or receive the data directly from the external interface 160 to store in the storage unit 140 and display them on the display unit 110. The display controller 130 may be separated into a communication unit to perform communication, an interface unit to interface with other elements and a network unit which can be provided as respective modules. According to another exemplary embodiment, the display controller 130 may be integrated with the vending machine controller 180 as a single chip or module instead of being separated from the vending machine controller 180.

The storage unit 140 stores therein price information or icons for products sold by the vending machine or a preset certification code inputted by a user. The storage unit 140 further stores therein data corresponding to images to be displayed according to each menu. The storage unit 140 may include a memory such as a hard disk drive (HDD), a flash memory, a random access memory (RAM), a read only memory (ROM), etc. FIG. 1 illustrates the storage unit 140 disposed in the display module 100a, but not limited thereto. Alternatively, the storage unit 140 may be provided in the vending machine module 100b.

The detector 150 detects whether the door 100 is open. If the door 100 is open, it may mean that the lock is released or the door 100 is open and not connected with a body of the vending machine. The detector 150 may detect the locking state of the door 100 by detecting an external force mechanically applied to the detector 150 or by using an electric switch. The detector 150 may include a sensor to detect whether the door 100 is separated from the body of the vending machine.

The external interface 160 may receive data or transmit data through wireless communication such as WiFi or Bluetooth. The external interface 160 may transmit data to an external device such as a universal serial bus (USB) stick or a memory card, or receive data therefrom. The external interface 160 may download information about a new product of the vending machine, or transmit sales information of the vending machine or information on a stock volume of the vending machine through wireless communication to a central administration server (not shown) which is remotely located. The external interface 160 may be used to download data to a device, for example, a Bluetooth supporting device owned by a user.

The speaker 170 outputs an audio signal. The speaker 170 outputs audio stored in the storage unit 140, or outputs an audio signal received from the outside through the external interface 160.

The vending machine controller 180 supports a general function of the vending machine to supply a product stored therein or discharge changes through transaction. Also, the vending machine controller 180 transmits information about the product or information about inserted money through communication with the display module 100a.

Figure 2:
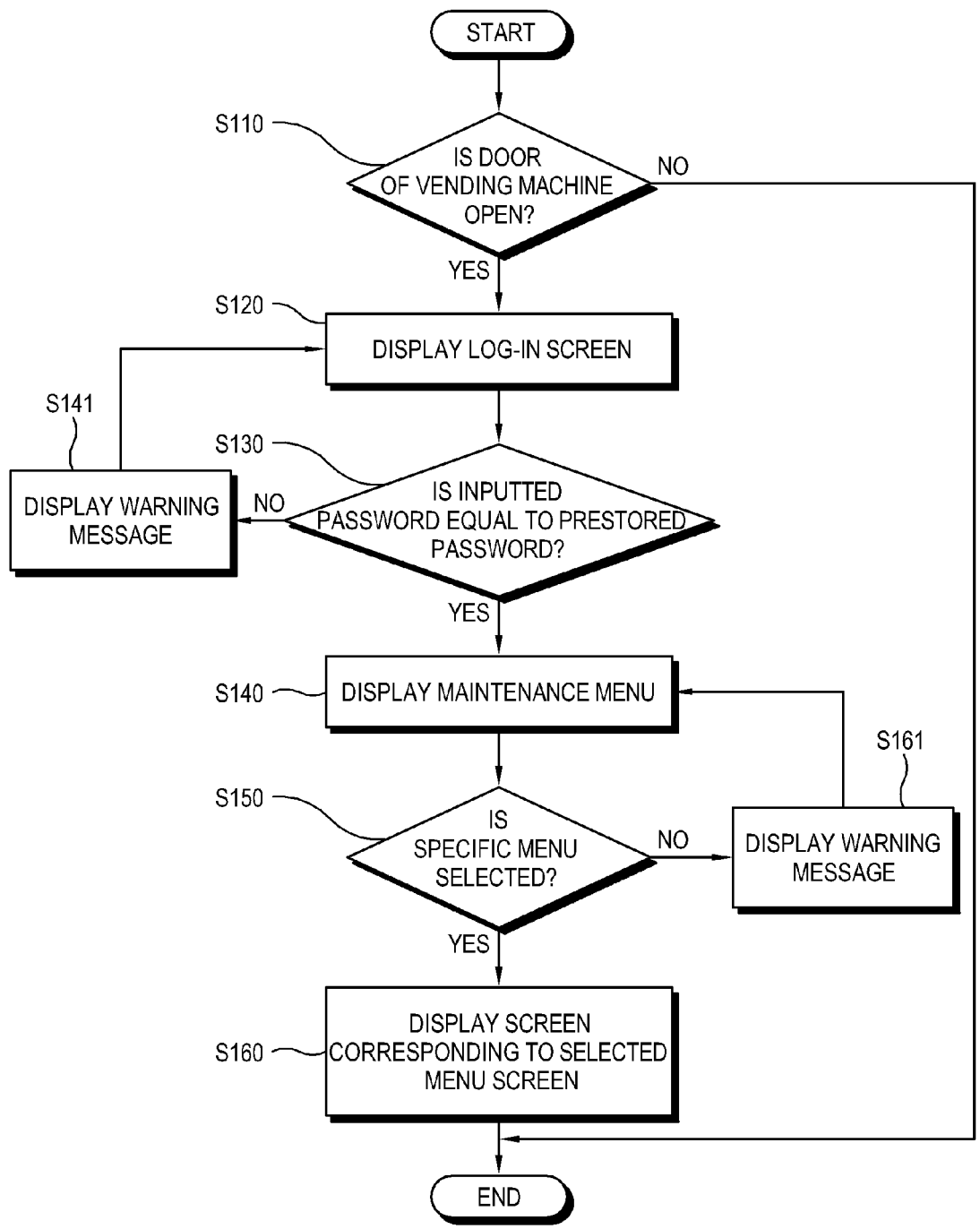
FIG. 2 is a flowchart to describe a control method of the vending machine in FIG. 1, according to an exemplary embodiment of the present invention.

FIG. 2 is a flowchart to describe an operation of the vending machine module 100b and the display module 100a, according to an exemplary embodiment of the present invention.

First, the detector 150 detects whether the door 100 of the vending machine is open (S110). The door 100 may be open if the door 100 is open or separated from the body of the vending machine. The detector 150 may detect the locking state of the door 100 by a mechanical method through external force or by an electric switch.

If it is determined that the door 100 is open (S110-Y), the display controller 130 changes the image mode of the display unit 110 from the user mode to the maintenance mode, and displays a log-in screen corresponding to the certification mode window (S120). According to the exemplary embodiment of the present invention, the log-in screen is displayed if the door 100 is open, but not limited thereto. Alternatively, if the door 100 is open, a new mode which is different from a current image mode may be displayed. If a menu screen for a product or an advertisement screen for a product is currently being displayed, a vending machine supplier's logo or a warning message for the open door 100 may be displayed if the door 100 is open. The maintenance menu may directly be displayed to maintain the vending machine without the log-in screen for certifying a user.

If it is determined that the door 100 is not open (S110-N), the image mode of the display unit 110 is not changed, and thus, a currently displayed screen is maintained.

If the log-in screen is displayed (S120), a user may input the user's own certification code. Here, the certification code includes a password. According to an exemplary embodiment of the present invention, the password is inputted by a user, but not limited thereto. Alternatively, a card reader may be provided to read a predetermined card. In this case, the display unit 110 may display a screen reading "insert card", "touch card" or "scan card" instead of displaying the log-in screen. If a different user certification mode is employed, the display unit 110 may display a message showing a user a certification method.

If a user inputs a password, the display controller 130 determines whether the password inputted by the user is the same as that stored in the storage unit 140 (S130).

If it is determined that the inputted password is the same as the stored password (S130-Y), the display controller 130 controls the display unit 110 to display the maintenance menu to maintain the vending machine (S140). If it is determined that the inputted password is not the same as the stored password (S130-N), a warning message such as "Not Identical" is displayed (S140), and the log-in screen is displayed again (S120) to receive a password from a user.

If the maintenance menu is displayed, it is determined whether the user selects a specific menu (S150). If it is determined that the specific menu is selected (S150-Y), the display unit 110 displays the screen corresponding to the selected menu (S160).

If the specific menu is not selected (S150-N), a message such as "select menu" is displayed (S161) and the maintenance menu may be displayed again (S140).

FIG. 3A illustrates a certification mode window to certify a user. FIG. 3B illustrates a certification mode change window to change a password. As shown therein, the certification mode window includes a part of a certification code input area and a cursor is displayed in the part of the area. In this case, a key pad may also be displayed so that a user can touch the key pad and input letters or numbers. The certification mode window includes a "LOGIN" button and a "CHANGE PASSWORD" button to change a password. If the "LOGIN" button is selected, it may be determined whether the certification code inputted by a user is the same as the prestored certification code. Here, the certification code may be a password. If the "CHANGE PASSWORD" button is selected, a screen enabling a user to change the password may be displayed. As shown in FIG. 3B, the certification mode change window includes a "Change Password" input box, a "New Password" input box and a "Confirm Password" input box. If a user selects each input box and inputs letters or numbers through the key pad, letters or numbers are displayed in the selected input box. If a user selects a "CANCEL" button not to change the password, the display unit 110 may display the log-in screen again.

Then, since the inputted letters or numbers may be exposed to the outside, the screen may display replaceable letters instead of displaying the inputted letters or numbers. According to the present exemplary embodiment, the key pad may include letters, characters and/or numbers, a button to erase all the inputted letters, characters and/or numbers, and a button to erase a letter, a character or a number right before the cursor.

Figure 4:
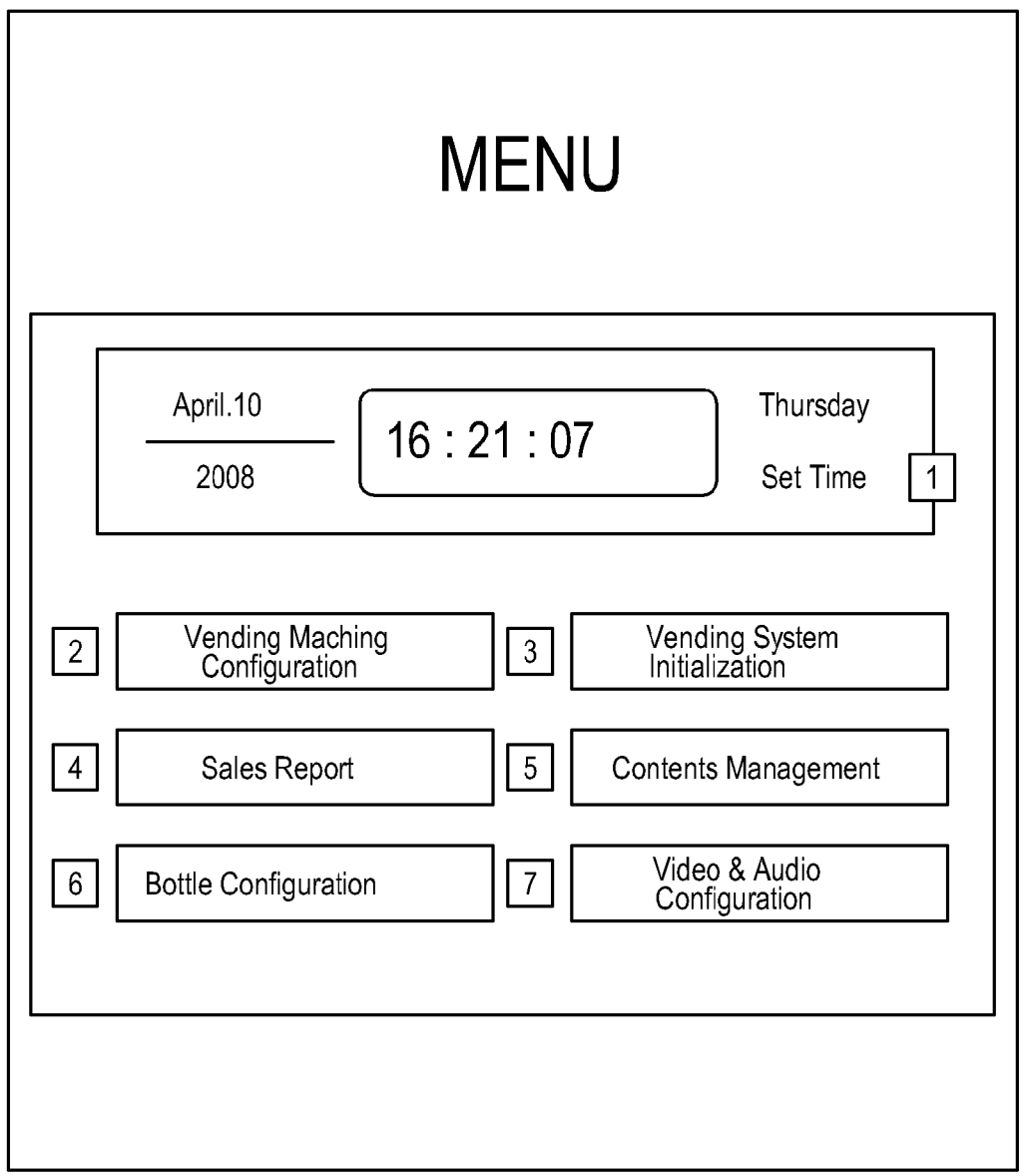
FIG. 4 illustrates a maintenance menu to maintain the vending machine, according to an exemplary embodiment of the present invention.

FIG. 4 illustrates a maintenance menu to maintain the vending machine according to an exemplary embodiment of the present invention. The maintenance menu may display a current date and time together with a "Set Time" button to enter a date and time change menu. If the "Set Time" button is selected, a set time menu is displayed (see FIG. 5). The maintenance menu may further display a "Vending Machine Configuration" button, a "Vending System Initialization" button, a "Sales Report" button, a "Contents Management" button, a "Bottle Configuration" button and a "Video & Audio Configuration" button.

Figure 5A:
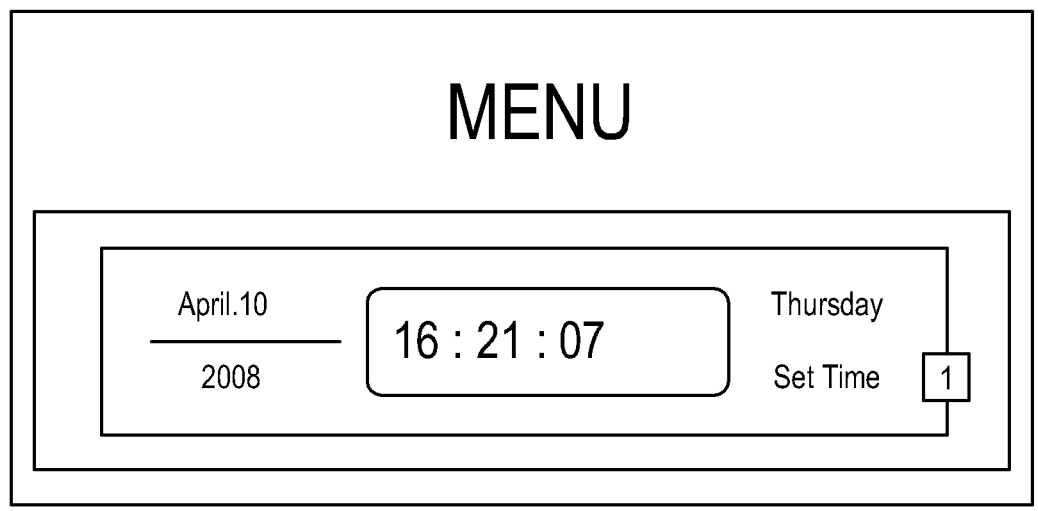
Figure 5C:
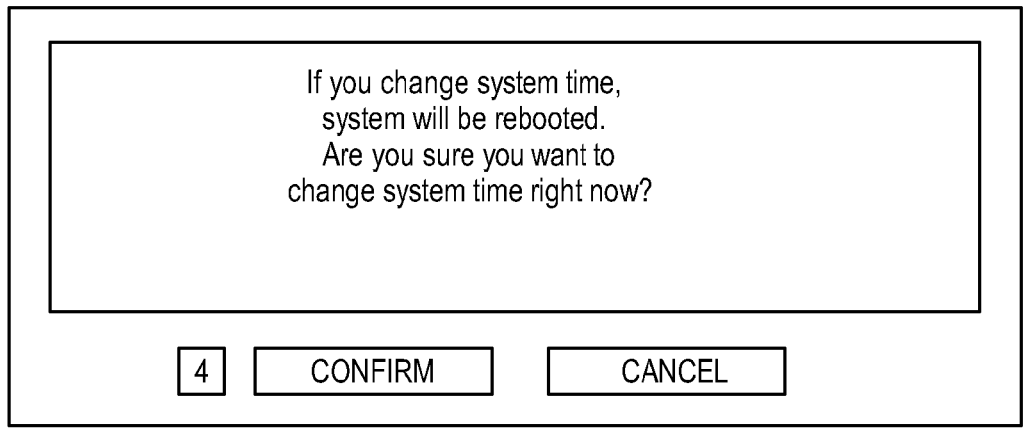
Figure 6A:
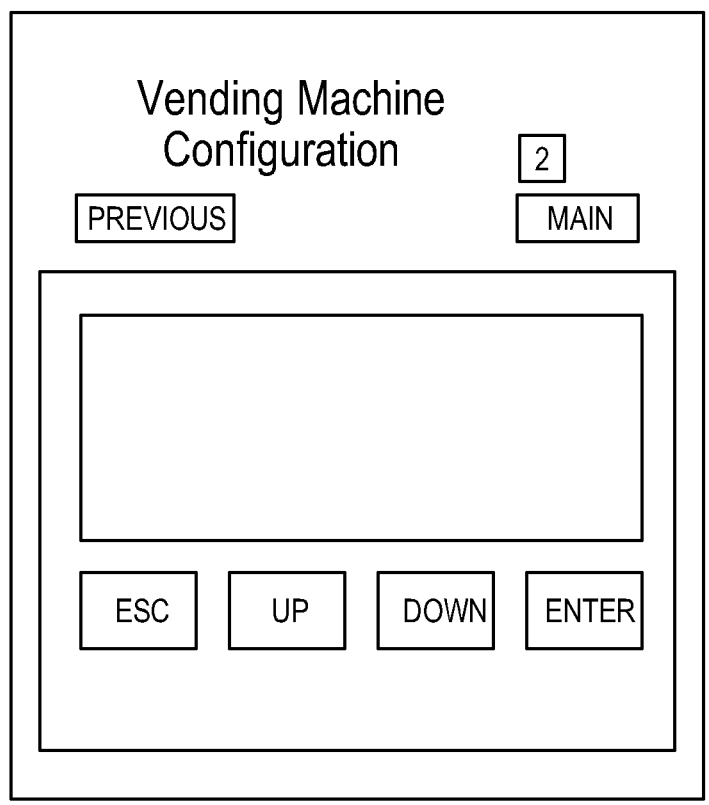
FIG. 6A illustrates a "Vending Machine Configuration" menu, according to an exemplary embodiment of the present invention.
Figure 6B:
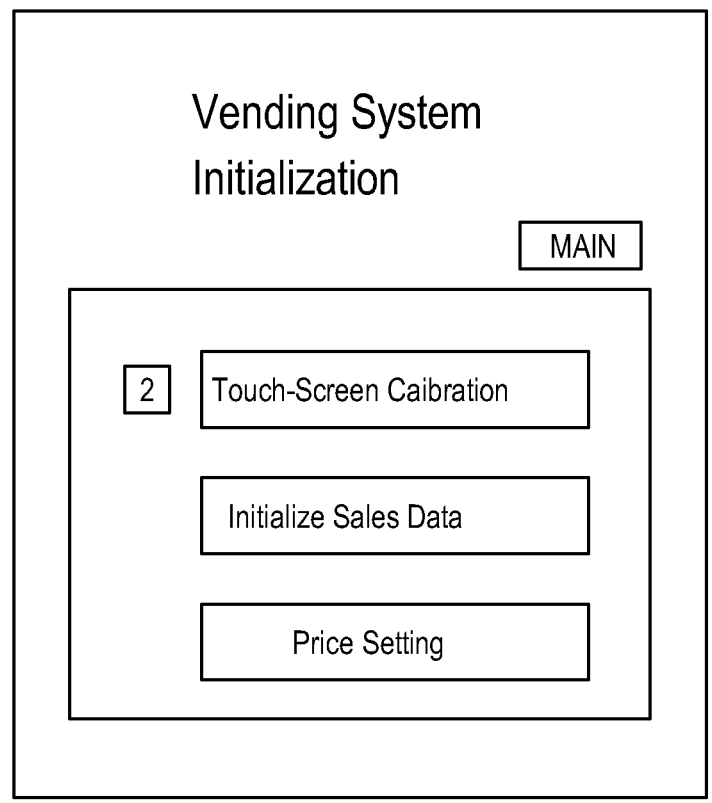
FIG. 6B illustrates a "Vending System Initialization" menu, according to an exemplary embodiment of the present invention.
Figure 6C:
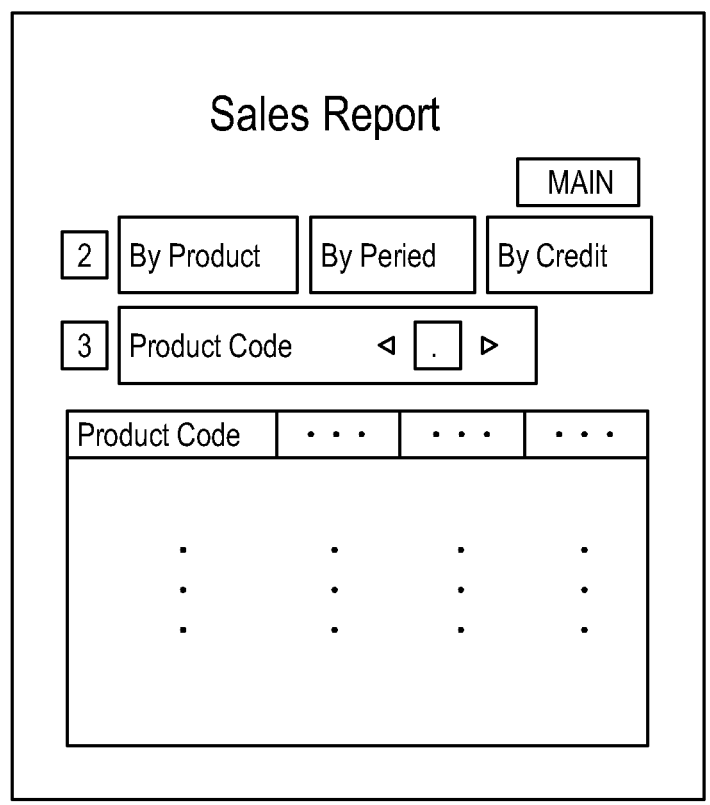
FIG. 6C illustrates a "Sales Report" menu, according to an exemplary embodiment of the present invention.

FIGS. 5A to 5C illustrate a set time menu which is displayed if the "Set Time" button as shown in FIG. 4 is selected. The set time menu displays an input box to input a year, a month, a date, a day, an hour, a minute and a second, together with a key pad including numbers. The key pad includes a button to erase the whole inputted numbers and a button to erase the number right before the cursor. Only one to twelve may be inputted for month while one to thirty-one may be inputted for date. Zero to twenty-three or one to twenty-four may be inputted for hour. One to fifty-nine may be inputted for a minute. A "SAVE" button to save the inputted numbers and a "BACK" button to go back to the maintenance menu may be displayed. If the date or time is changed and saved, "confirm" and "cancel" buttons may be displayed together with a message informing that the system will be rebooted if the date or time is changed FIGS. 6A, 6B and 6C illustrate a "Vending Machine Configuration" menu, a "Vending System Initialization" menu and a "Sales Report" menu, according to an exemplary embodiment of the present invention. The "Vending Machine Configuration" menu includes a display window to display the configuration of the vending machine to change the configuration and "ESC", "UP", "DOWN" and "ENTER" buttons. The "Vending Machine Configuration" menu may further display a "PREVIOUS" button to go back to the maintenance menu. The "Vending System Initialization" menu displays "Touch-Screen Calibration", "Initialize Sales Data" and "Price Setting" buttons, and displays sub menus according to the selected button.

The "Sales Report" menu includes a tab to calculate sales by product, period and payment means. If the sales are calculated for a selected product, the vending machine controller 180 calculates sales of the selected product and transmits the calculation result to the display module 100a. The display module 100a may display the transmitted sales report. If the sales are calculated for period, the vending machine controller 180 may calculate the sales for a preset period such as a week, month or year. Alternatively, a user may input a period directly to calculate the sales by period. As for the sales by payment means, the vending machine controller 180 may calculate the sales on the basis of the payment such as credit card or cash. A total button is provided to calculate the total sales.

Figure 7B:
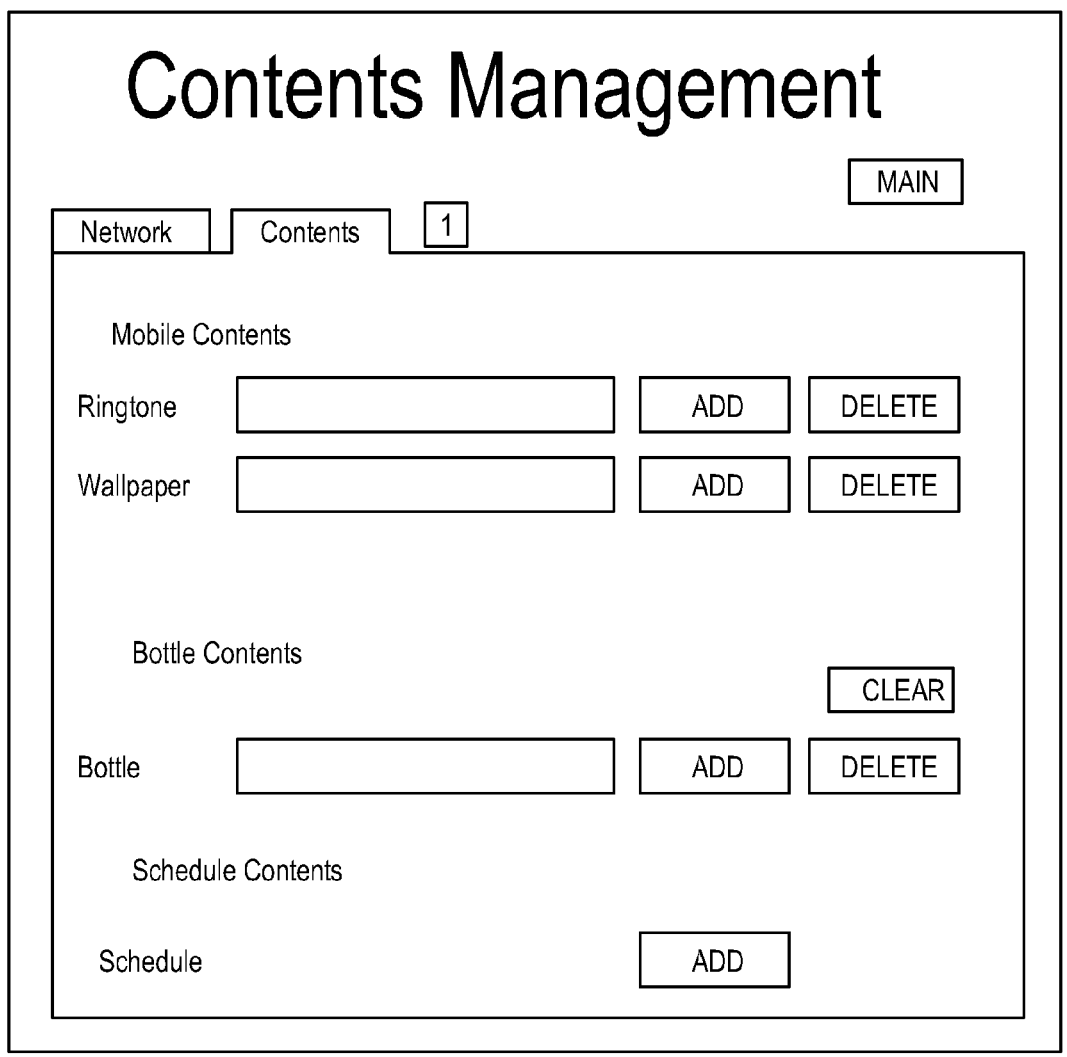

FIGS. 7A and 7B illustrate a "Contents Management" menu. The "Contents Management" menu includes two tabs of "Network" and "Contents", according to an exemplary embodiment of the present invention. The "Contents Management" menu may include other tabs to manage the displayed contents. The IP address, subnet mask, default gateway and DNS server address may be set through the network tab. A "SAVE" button may be also displayed to save the set addresses. In this case, a key pad may be displayed to input addresses. The contents tab may be provided to input a location that stores images corresponding to contents such as a ringtone, a wallpaper and a bottle type. Each of the contents may be set to include a plurality of images. Images according to each of the contents may be downloaded by connecting an external device to the display module 100a or vending machine module 100b, or downloaded through a network in a wireless communication. A user may set the timing of displaying video if the video is to be displayed. "ADD" and "DELETE" buttons may be displayed for each of the contents. If the "ADD" button is selected for one of the ringtone, wallpaper and bottle type of the contents tab, a list of stored image files is displayed. If one of the image files is selected, the image is displayed on a screen so that a user knows what image is selected. The "Contents Management" menu according to the exemplary embodiment includes the "ADD" button. If the "ADD" button is not provided and each content is selected, a list of stored image files may be displayed.

Figure 8A:
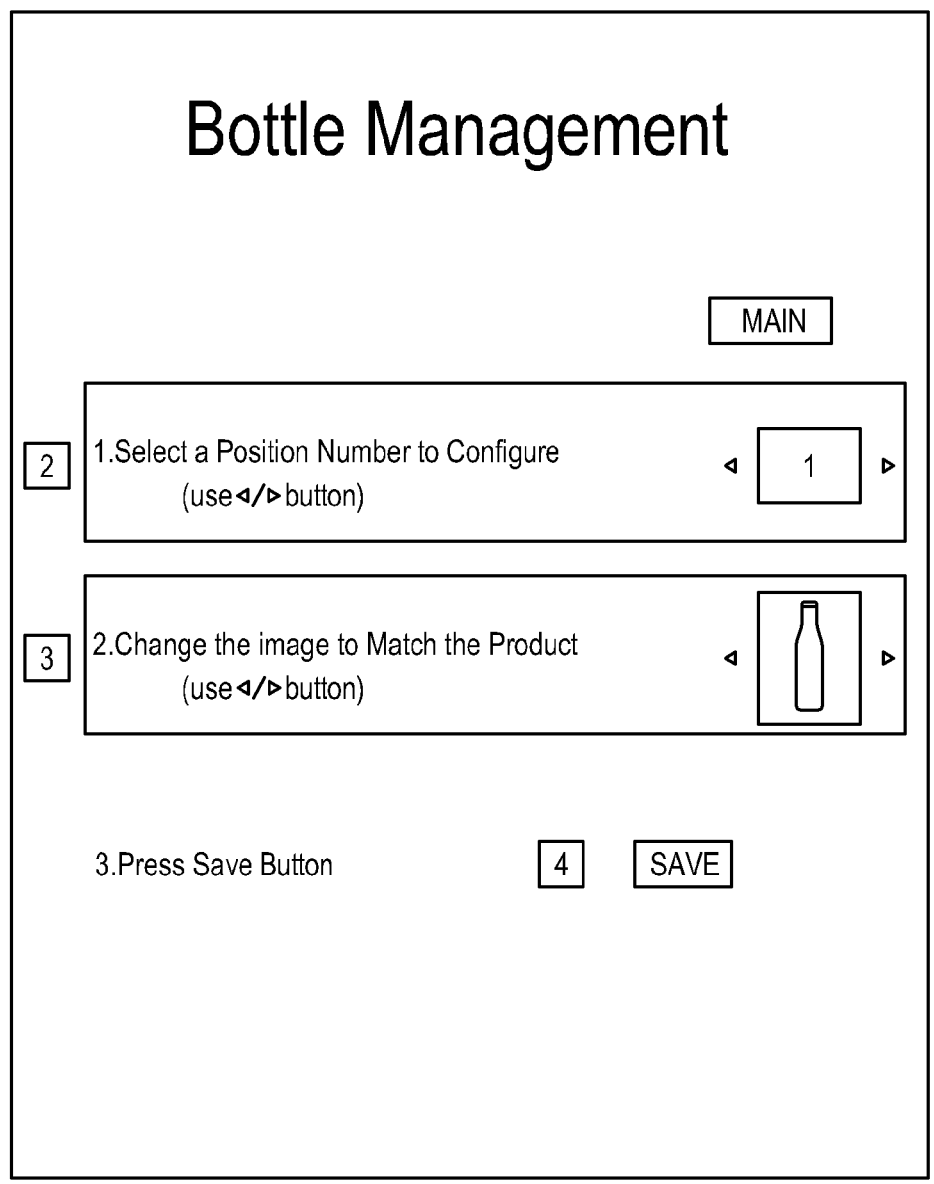
FIG. 8A illustrates a "Bottle Management" menu, according to an exemplary embodiment of the present invention.
Figure 8B:
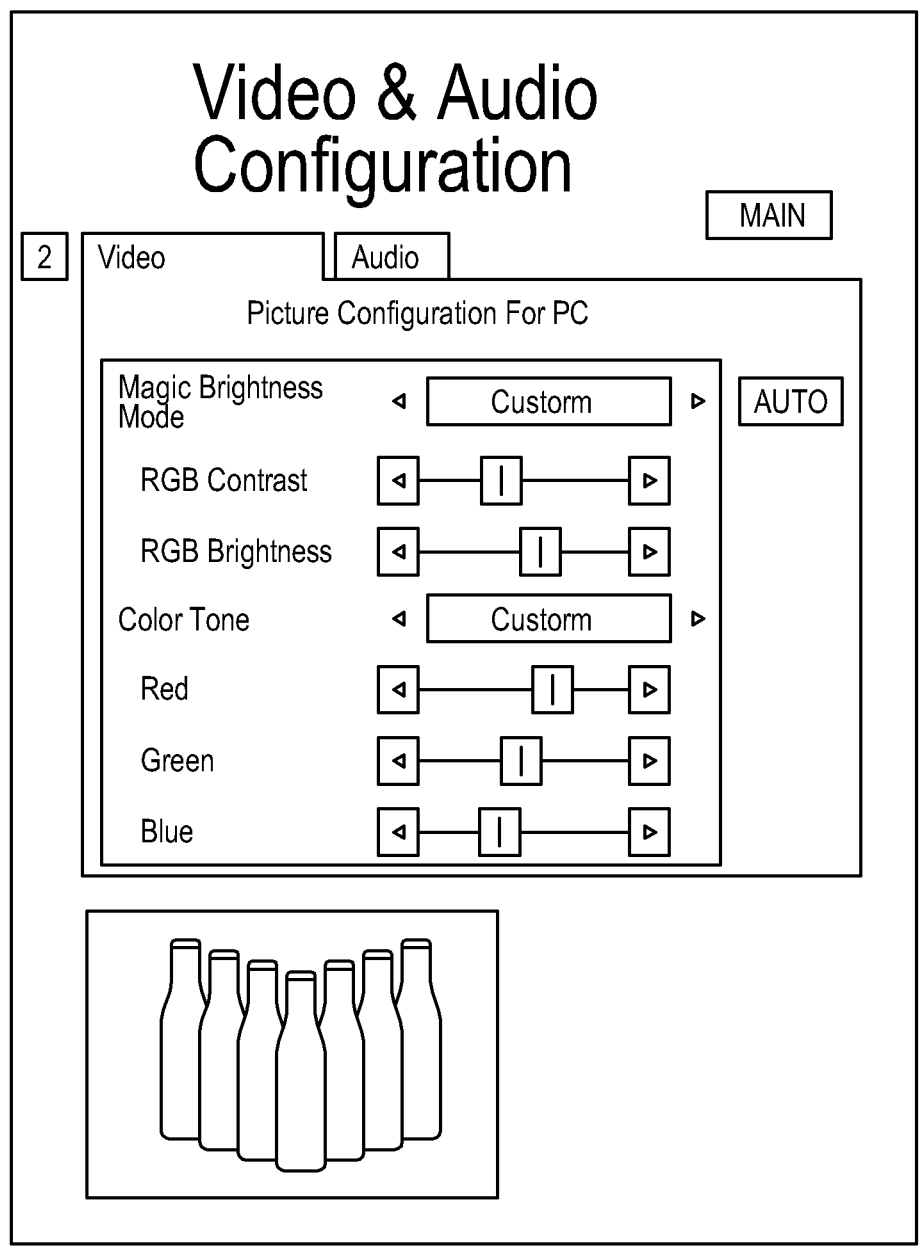
FIG. 8B illustrates a "Video & Audio Configuration" menu, according to an exemplary embodiment of the present invention.
Figure 8C:
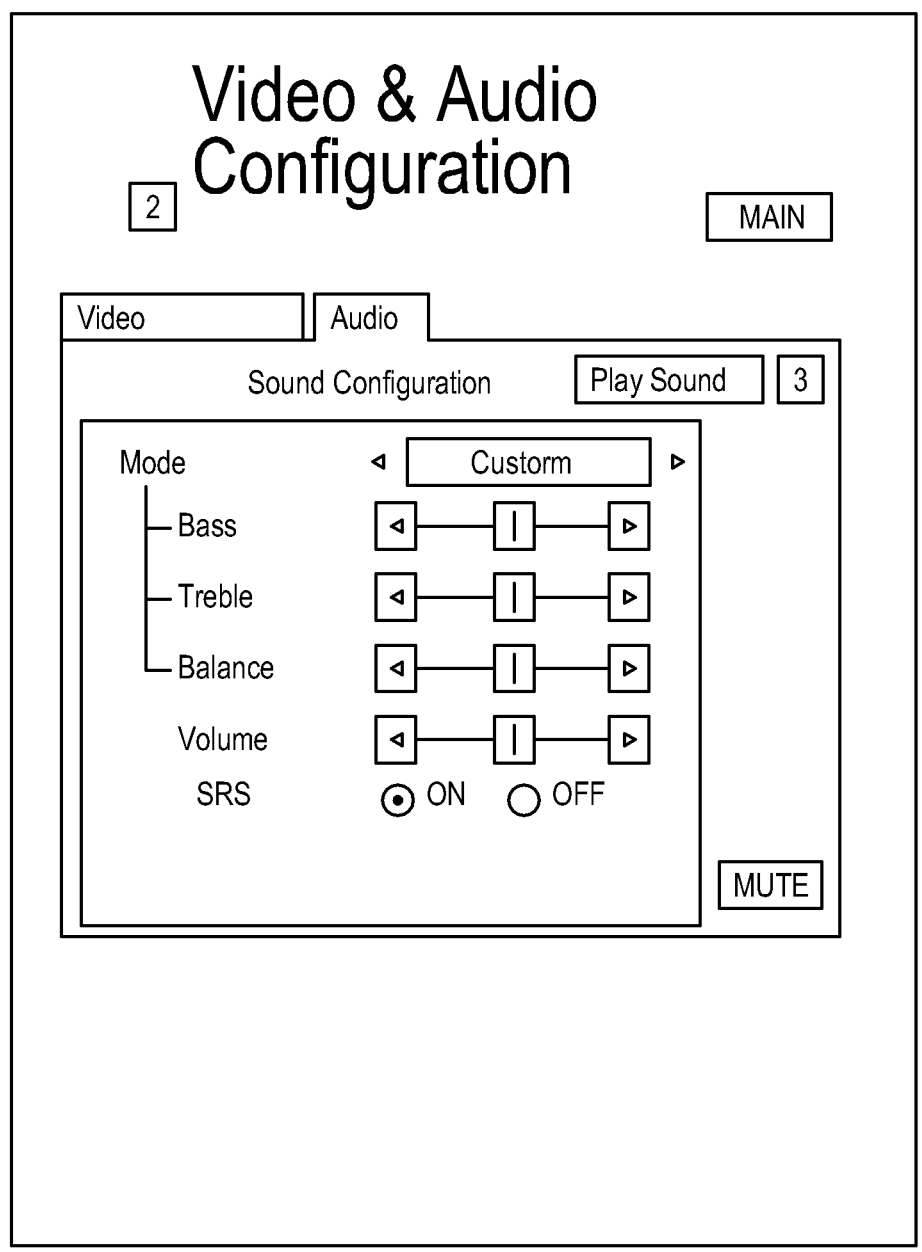
FIG. 8C illustrates an "Video & Audio Configuration" menu, according to another exemplary embodiment of the present invention.

FIGS. 8A, 8B and 8C illustrate "Bottle Management" and "Video & Audio Configuration" menus, according to an exemplary embodiment of the present invention. The "Bottle Management" menu may include a menu to select a product whose bottle type is to be changed, and a menu to select a bottle type. According to the exemplary embodiment of the present invention, the "Bottle Management" menu displays a product in a bottle type, but not limited thereto. Alternatively, the "Bottle Management" menu may display a product in a type of a can, a PET or the like. A "SAVE" button is also displayed to save the setting if the selection is completed. The "Video & Audio Configuration" menu includes "Video" and "Audio" tabs to adjust video and audio, respectively. The "Video" tab includes menus to adjust properties such as contrast, brightness and RGB gain values of a displayed image. An "AUTO" button may be also displayed to automatically change the values into a preset value. The "Audio" tab includes menus to adjust bass, treble and balance, and a menu to adjust volume gradually. A "MUTE" button may be also displayed to automatically lower the volume into zero.

As described above, the present invention provides a vending machine which is easily maintained through a display unit, and a control method thereof.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A control method of an electronic machine which has a display module to display an image stored therein or inputted from an outside device, the control method comprising:

detecting that a door of the electronic machine is open; and changing an image screen of the display module accommodated in the door in response to the detection that the door of the electronic machine is open, wherein the changing comprises displaying a certification mode window provided to certify a user of the electronic machine.

2. The control method according to claim 1, wherein the certification mode window comprises an area in which a certification code is inputted and a cursor is displayed in the area.

3. The control method according to claim 2, wherein the certification mode window comprises a key pad provided for inputting at least one of letters, symbols and numbers, the control method further comprises:
- detecting a touch on the key pad; and
- inputting letters, symbols or numbers corresponding to the touch on the key pad in the area in which the certification code is inputted.

4. The control method according to claim 2, wherein a log-in button image is displayed in the certification mode window, the log-in button image arranged to be selected in order to determine whether the inputted certification code is the same as a prestored certification code.

5. The control method according to claim 1, wherein the determining whether the door of the electronic machine is open comprises determining whether the door of the electronic machine is connected with a body of the electronic machine mechanically or electrically.

6. The control method according to claim 1, wherein a button image is displayed in the certification mode window, the button image arranged to be selected to move to a certification mode change window provided for changing a certification code, and the control method further comprises:
- detecting that the button image is selected by a touch by the user; and
- displaying the certification code change window in response to the detection that the button image is selected.

7. The control method according to claim 1, wherein the certification code comprises at least one of the letters, the symbols and the numbers.

8. The control method according to claim 1, further comprising
- detecting that the inputted certification code is equal to a prestored certification code if the certification code is inputted.

9. The control method according to claim 8, further comprising
- displaying a maintenance menu to maintain the electronic machine if it is determined that the inputted certification code is equal to the prestored certification code.

10. The control method according to claim 9, wherein the maintenance menu comprises an item to modify, input, delete or save at least one of a sales volume of a product, a price of the product, an image of the product and a background screen.

11. The control method according to claim 1, wherein the electronic machine comprises a vending machine.

12. An electronic machine, comprising:
- a display unit which displays an image stored therein or inputted from an outside device;
- a user input unit which receives an input signal from a user;
- a door which accommodates the display unit;
- a detector which detects that the door is open; and
- a controller which changes an image screen of the display unit in response to the detection that the door is open, wherein the display unit displays a certification mode window provided for inputting a certification mode to certify the user.

13. The electronic machine according to claim 12, wherein the certification mode window comprises an area in which the certification code is inputted, and a cursor is displayed in the area.

14. The electronic machine according to claim 13, wherein the certification mode window comprises a key pad provided for inputting at least one of numbers, symbols and letters, and the controller inputs the at least one of numbers, symbols and letters corresponding to a touch on the key pad, in the area in which the certification code is inputted if the touch is detected from the user input unit.

15. The electronic machine according to claim 13, wherein a log-in button image is displayed in the certification mode window, the log-in button image arranged to be selected in order to determine whether the inputted certification code is the same as a prestored certification code.

16. The electronic machine according to claim 12, wherein a button image is displayed in the certification code window, the button image arranged to be selected to move to a certification code change window provided for changing the certification code, and the controller controls the display unit to display the certification code change window if the button image is selected from the user input unit.

17. The electronic machine according to claim 12, further comprising a storage unit to store a preset certification code therein, wherein the controller determines whether the inputted certification code is equal to the preset certification code.

18. The electronic machine according to claim 17, wherein the controller displays a maintenance menu to maintain the electronic machine if it is determined that the inputted certification code is equal to the preset certification code, and the maintenance menu comprises an item to modify, input, delete or save at least one of a sales volume of a product, a price of the product, an image of the product and a background screen.

19. The electronic machine according to claim 12, wherein the detector detects that the door of the electronic machine is connected with a body of the electronic machine mechanically or electrically to detect that the door is open.

20. The electronic machine according to 12, further comprising:
- an interface through which data of a product contained in the electronic machine, corresponding to information on the product, is received from an outside device and transmitted to the outside device in a wireless manner; and
- a storage unit that stores the data of the product;
- wherein the display unit displays the information on the product,
- wherein the controller controls the display unit to display the information on the product based on the data of the product, and controls the interface to receive from and transmit to the outside device the data corresponding to the information, and
- wherein the data comprises an image, a price, a quantity and sales data of the product.

21. The electronic machine according to claim 12, wherein the electronic machine comprises a vending machine.

* * * * *